United States Patent [19]

Hakoun et al.

[11] Patent Number: 4,695,306
[45] Date of Patent: Sep. 22, 1987

[54] AUTOMATIC MACHINE FOR WELDING TWO OPTICAL FIBERS END-TO-END

[75] Inventors: Roland Hakoun, Paris; Michel Jurczyszyn, Ivry Sur Seine, both of France

[73] Assignee: Optiques Compagnie Lyonnaise de Tranmissions, Clichy, France

[21] Appl. No.: 828,089

[22] Filed: Feb. 10, 1986

Related U.S. Application Data

[63] Continuation of Ser. No. 664,445, Oct. 24, 1984, abandoned.

[30] Foreign Application Priority Data

Oct. 24, 1983 [FR] France ................................ 83 16889
Apr. 20, 1984 [FR] France ................................ 84 06300

[51] Int. Cl.$^4$ ........................... C03B 9/42; C03B 23/20
[52] U.S. Cl. ........................................ 65/152; 65/158; 65/160; 65/4.2
[58] Field of Search ............... 65/4.1, 4.2, 4.21, 2 G, 65/152, 158, 160; 356/73.1

[56] References Cited

U.S. PATENT DOCUMENTS

| | | | |
|---|---|---|---|
| 3,960,531 | 6/1976 | Kohanzadeh et al. | 65/4.21 |
| 4,266,852 | 5/1981 | Higgins et al. | 65/4.2 |
| 4,319,902 | 3/1982 | Hensel | 65/4.21 |
| 4,350,867 | 9/1982 | Kinoshita et al. | 65/4.21 |
| 4,372,768 | 2/1983 | Zucker et al. | 65/27 |
| 4,439,221 | 3/1984 | Smyth et al. | 65/4.21 |

FOREIGN PATENT DOCUMENTS 2300744 9/1976 France ................................ 65/4.21
56-35112 4/1981 Japan .

OTHER PUBLICATIONS

Research Disclosure No. 21643, Apr. 1982, by Fiber-Fusion Ltd., "Automatic Positioning and Alignment Equipment for Optical Fibers", pp. 131-132.

Primary Examiner—S. Leon Bashore
Assistant Examiner—Michael K. Boyer
Attorney, Agent, or Firm—Sughrue, Mion, Zinn, Macpeak & Seas

[57] ABSTRACT

An automatic machine for welding optical fibers end-to-end comprises a first plate (1) for supporting a first or "reference" fiber (2) and a second plate (5) for supporting a second or "moving" fiber (6). The second plate can be translated along Ox and Oy axes in a plane perpendicular to the axes of the fibers. The ends of the fibers are illuminated by light sources (30, 31), optical systems make images thereof, and optical pick-ups (12, 13, 18, 19) located at the image points provide optical signals representative of the positions of the optical fibers relative to each of said Ox and Oy axes. These signals are converted into electrical signals and are compared by electronic comparators (15, 21) which deliver corresponding error signals to control means (17, 23, 24) for moving the second plate until the moving fiber is in alignment with the reference fiber.

12 Claims, 6 Drawing Figures

AUTOMATIC MACHINE FOR WELDING TWO OPTICAL FIBERS END-TO-END

This is a continuation of application Ser. No. 664,445, filed Oct. 24, 1984, now abandoned.

The present invention relates to an automatic machine for welding optical fibers end-to-end, the machine being of the type comprising:
  first and second optical fiber support plates respectively for supporting a first, or "reference" optical fiber, and a second or "moving" optical fiber;
  automatic translation means connected to said second support plate for moving said second support plate in two orthogonal directions which are perpendicular to the axes of the fibers;
  automatic translation means connected to one of said support plates for moving said support plate parallel to the axes of the fibers;
  manual translation means connected to the other one of sadi support plates for moving said other support plate parallel to the axes of the fibers;
  position detecting means comprising light source means for illuminating the ends of the optical fibers; optical lens means for forming magnified images thereof; and optical pick-up means responsive to the positions of said images;
  control means responsive to signals derived from said optical pick-up means and connected to control said automatic translation means; and
  fiber welding means.

BACKGROUND OF THE INVENTION

U.S. Pat. No. 3,960,531 describes a machine comprising a first plate for supporting a first optical fiber and equipped with means for translation parallel to the axis of the fiber, a second plate for supporting a second optical fiber and equipped with means for horizontal and vertical translation perpendicular to the axis of the fibers, a microscope for observing the ends of the optical fibers while their axes are being aligned by manual displacement of the plates, a moving wedge for marking a welding plane by the wedge abutting against the end of one of the fibers, and two electrodes for welding the ends of the fibers in the welding plane.

Such a machine is only applicable to low accuracy end-to-end welding of optical fibers, eg. for multimode fibers having a core diameter of about 100 microns.

The machine is not suitable for the kind of accuracy required to minimize light losses due welding nor is it suitable under any circumstances for monomode fibers which have a core diameter of a few microns only.

It is for such reasons that Research Disclosure No. 21643, April 1982 describes an automatic machine for positioning optical fibers, in particular for welding, along three orthogonal axes by means of a TV camera controlling a microprocessor. However, such a machine is very complex and expensive.

Preferred embodiments of the present invention provide an automatic machine for end-to-end welding of optical fibers with the axes of the fibers being aligned with great accuracy, eg. about 1/10-th of a micron. The machine can also reduce welding defects. Furthermore, alignment is performed rapidly without the need for operator dexterity, the heating of the fiber ends during welding can be closely controlled, and various welding cycles can be reproduced at will.

SUMMARY OF THE INVENTION

According to the present invention, a machine of the above-defined type includes the improvement wherein said position detecting means includes pick-up means for detecting the position of each fiber end in two orthogonal directions corresponding to the said orthogonal directions perpendicular to the axes of the fibers, each fiber end thus being associated with at least two optical pick-ups, one for each of said orthogonal directions, the signals from said optical pick-ups being applied to respective tansducers to be converted into respective electrical signals, which electrical signals are so connected to electronic comparators that, for each of said orthogonal directions, the electrical signals derived from pick-ups associated with different optical fiber ends are electronically compared, and the electrical signals resulting from said comparisons are connected to said control means to enable said control means to control said automatic translation means to bring said fiber ends into alignment, and into end-to-end contact ready to be welded together.

A machine in accordance with the invention preferably includes at least one of the following features.

For each of said orthogonal directions, said position detecting means comprises said light source means located on one side of the fiber ends, a common optical lens means located on the other side thereof for forming magnified real images of the optical fiber ends, and respective optical pick-ups located at said images.

Said control means include a microprocessor.

Said comparators are connected to operate respective light-emitting diodes. The idea is to provide a matrix display covering a range of positions and to indicate the position of each fiber on the matrix display in a unique manner (eg. a steady light for the reference fiber and a flashing light for the moving fiber). When placing the fibers in the machine, the operator then attempts to obtain as good an alignment as possible by superposing the two indications. The superposed flashing and steady lights may be anywhere in the matrix display, since absolute position is immaterial.

Said automatic translation means for movement in a direction parallel to the fiber axes is connected to said second support plate for supporting the moving fiber.

Said automatic translation means for movement in a direction parallel to the fiber axes is constituted by a high-resolution stepper motor.

The machine further comprises means for backing off the moving fiber by a few tenths of a micron after end-to-end contact is established between the fibers.

Said means for backing off the moving fiber are under the control of said control means.

Second support plate for supporting the moving fiber is fixed to the free end of a cantilever bar having an intermediate point engaged in a bead of very hard material, said bead being in contact with wedges of piezoelectric material constituting said automatic translation means for moving said second support plate in two orthogonal directions perpendicular to the fiber axes.

Said means for welding the ends of the fibers comprises electric arc welding electrodes made of platinum plated tungsten.

Said machine includes means for pre-heating the ends of the aligned fibers while not in end-to-end contact, to polish their end faces prior to welding.

Each image of a fiber end is formed by a respective optical lens means.

Said light source means is constituted by a single light source for each of said orthogonal directions and common to both fiber ends.

Each optical pick-up means associated with an image of a fiber end is constituted by a pair of optical pick-ups connected to a corresponding pair of respective transducers, the electrical signals from each pair of transducers being connected to a corresponding electronic comparator to provide an electrical signal representative of the position of the corresponding fiber end image.

For each of said orthogonal directions, said electrical signals representative of the positions of the fiber end images are themselves compared by an electronic comparator.

BRIEF DESCRIPTION OF THE DRAWINGS

An embodiment of the invention is described below by way of example and with reference to the accompanying drawings which show an automatic machine for welding two monomode optical fibers end-to-end, together with various optical and electronic devices for observing the ends of the optical fibers and for detecting when they are out of alignment in a horizontal plane.

It will readily be understood that similar devices are also required for use in a vertical plane in order to properly align the optical fibers before welding.

MORE DETAILED DESCRIPTION

Figure 1:
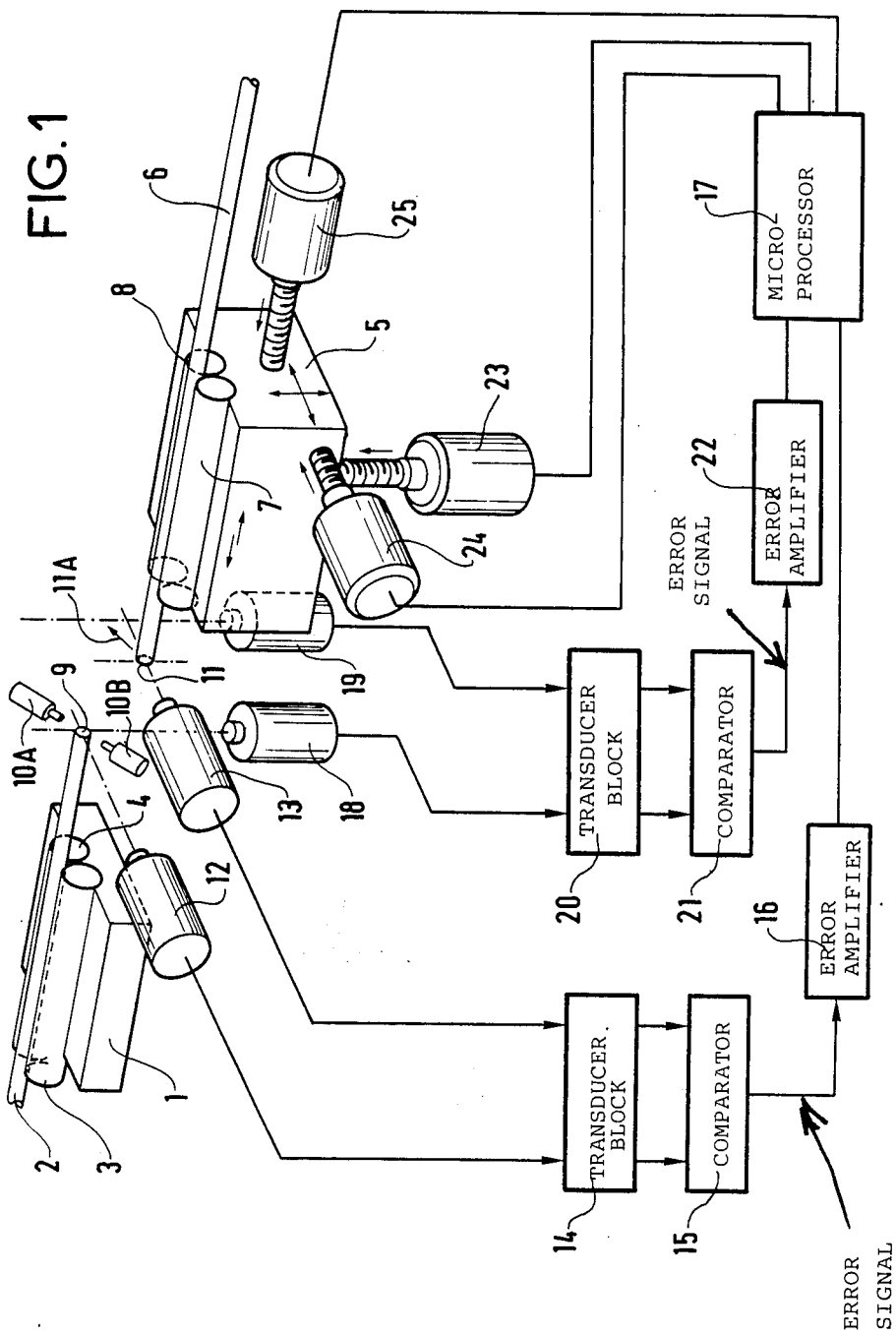
FIG. 1 is a diagrammatic perspective view of the machine, showing the fiber-supporting plates, the photo-detectors and the units for positioning the moving fiber.

In FIG. 1, a first plate 1 serves to support a first or "fixed" or "reference" optical fiber 2 which rests in the groove between two adjacent cylindrical metal rods 3 and 4 which are themselves crimped into grooves in the plate 1. A second plate 5 serves as a support for a second or "moving" optical fiber 6 which rests in the groove between the similar cylindrical metal rods 7 and 8 likewise crimped into grooves in the second plate. The optical fibers 2 and 6 are held in place on their support plates by clips (not shown).

The end face 9 of the first fiber 2 is moved by adjusting the position of the first plate 1 by means of knurled adjustment knob (not shown) until it lies in the plane of welding electrodes 10A and 10B. The welding electrodes are preferably made of tungsten and thorium and include a platinum coating to prevent corrosion.

Once the fibers have been initially loaded into the clips, the end face 11 of the moving fiber is generally offset both vertically and horizontally from the end face of the fixed fiber, as indicated by arrow 11A. Throughout this description offsets are shown exaggerated, this is because monomode optical fibers need to be aligned very accurately, and commonly encountered degrees of offset in need of correction would hardly show up in the figures.

The positions of the reference fiber 2 and the moving fiber 6 are detected by means of two optical pick-ups 12 and 13 which are optimized for subsequent use in adjusting the horizontal position of the fibers, and by means of two optical pick-ups 18 and 19 which are optimized for use in adjusting the vertical position of the fibers as explained below with reference to FIG. 2.

The signals from the optical pick-ups 12 and 13 on receiving light beams (not shown in FIG. 1) are transformed into respective electrical signals by a first photo-receiver or transducer block 14. These electrical signals are compared by a first comparator 15 which generates an error signal which is amplified by a first amplifier 16 and is then applied to a microprocessor 17.

Likewise, the signals from the optical pickups 18 and 19 are transformed into respective electrical signals by a second photo-receiver or transducer block 20 and these electrical signals are compared by a second comparator 21. The resulting error signal is applied to the microprocessor 17 via a second error amplifier 22.

On the basis of the signals derived from the optical pick-ups, the microprocessor delivers instructions for correcting the position of the second plate 5 which serves to move the "moving" fiber 6. A first correction instruction is applied to a first motor unit 23 which moves the plate in a vertical plane, and a second correction instruction is applied to a second motor unit 24 to move the moving plate 5 in a horizontal plane. These motor units may be constituted, for example, by piezoelectric blades whose operation is described in greater detail below with reference to FIG. 3.

In addition, once the moving fiber has been correctly positioned, the microprocessor 17 uses a third motor unit 25 to control an approach sequence bringing the end 11 of the moving fiber 6 fixed to the plate 5 into contact with the end 9 of the reference fiber. The pick-ups then sense the initial bending of the fibers due to their coming into contact and defining their contact plane. The microprocessor 17 then controls a slight backing off of the moving fiber, and welding can then take place.

Figure 2:
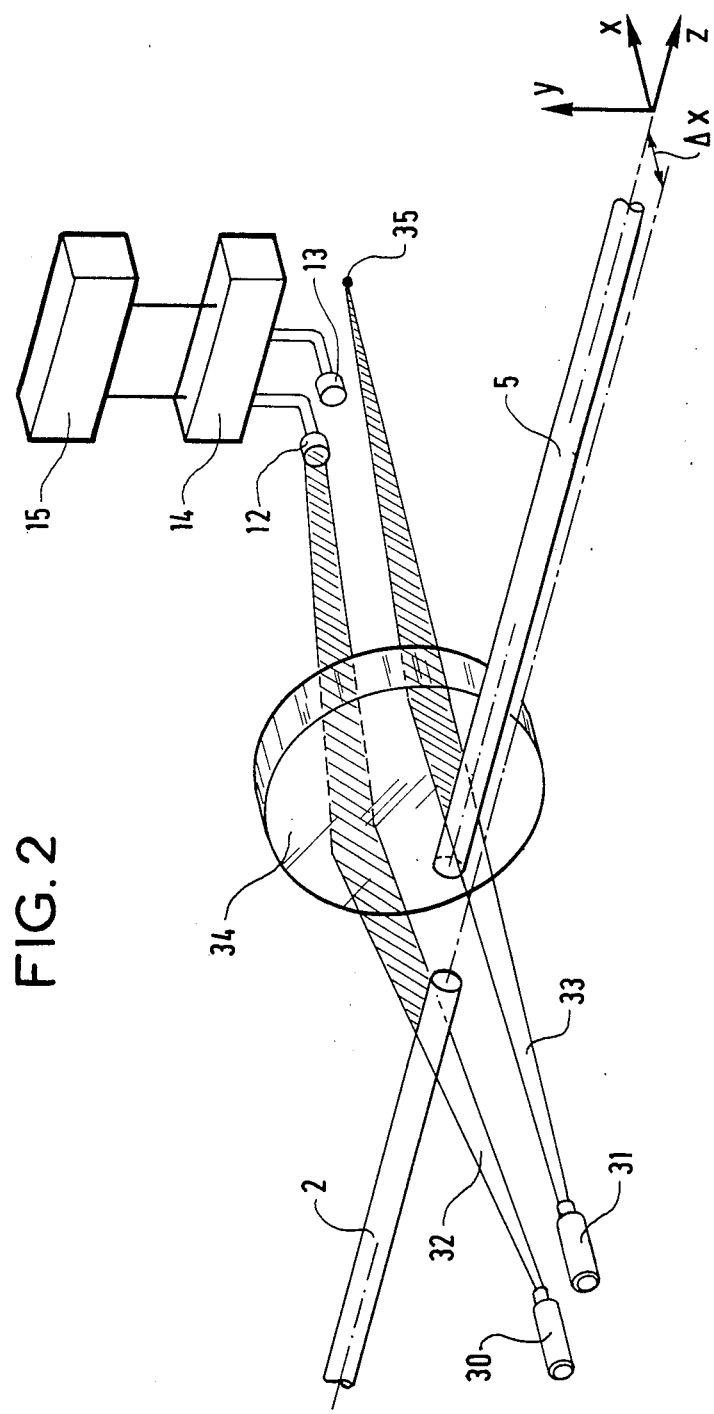
FIG. 2 is a perspective and block diagram of a first opto-electronic reader device for observing the positions of the ends of the fibers to enable the axis of the moving fiber to be moved into alignment with the axis of the fixed fiber.

FIG. 2 shows in greater detail how two pick-ups, such as 12 and 13 are used for adjusting position. Light sources 30 and 31 direct respective light beams 32 and 33 towards the ends of the reference fiber 2 and the moving fiber 5 respectively. Downstream from each fiber, there is a zone in each beam which includes a projected shadow of the fiber. The shadowcontaining beams are then enlarged by a common optical lens system 34 to object image points at which the pick-ups 12 and 13 are located. Each pick-up has two adjacent rectangular light-receiving areas. The shadow zone cast the fiber overlaps partially onto both of these areas, which are generally not equally affected, thereby giving rise to electrical signals representative of the position of the shadow, and hence of the optical fiber that cast the shadow. When the moving optical fiber 6 is not in the same plane as the reference optical fiber 2, the offset between the fibers is represented by the offset between the positions of their respective shadows on the optical pick-ups 12 and 13.

An entirely similar arrangement using the pick-ups 18 and 19 detects the vertical offset between the fibers 2 and 6 and transmits information representative thereof to the microprocessor 17. The microprocessor sends instructions to the motor units 23 and 24 as a function of the offset information it receives, thereby reducing the offsets.

Figure 3:
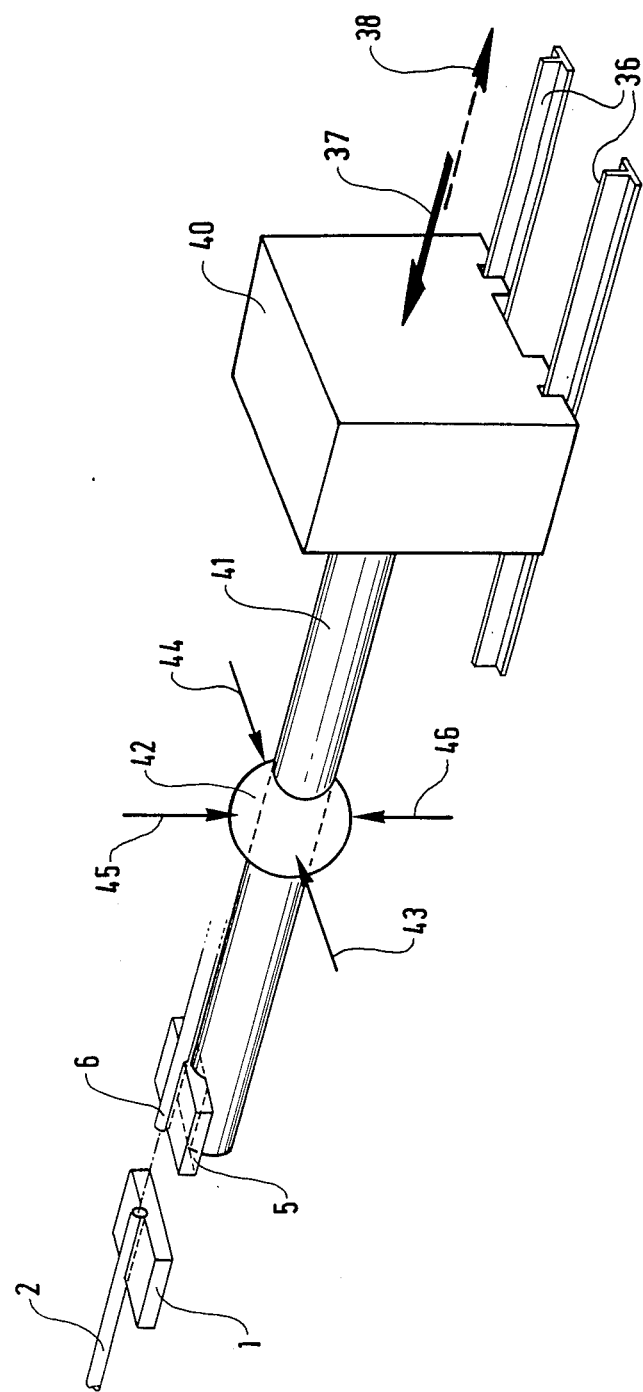
FIG. 3 is a perspective view of a cantilever bar having the moving fiber support plate fixed to its free end, and having a bead of hard material for applying piezoelectric position-adjusting pressures to bar in order to adjust the position of the moving fiber.

The motor units which respond to the microprocessor to reduce the Ox and Oy offsets (see FIG. 2) to substantially nil and to move the end faces of the fibers into mutual contact (along the Oz axis) are shown in greater detail in FIG. 3.

The second support plate 5 is fixed to the free end of a cantilevered beam 41 whose other end is fixed in a block 40. The beam passes through a spherical bead 42 for applying adjustment forces thereto. The bead 42 is made of hard material such as synthetic ruby and is in contact with two pairs of piezoelectric wedges which are shown diagrammatically by arrows 43 & 44 and 45 & 46. The wedges 43 & 44 serve to displace the moving fiber in the horizontal plane, while the wedges 45 & 46 serve to displace the moving fiber in the vertical plane. The piezoelectric wedges could be replaced by micromotors.

Although the fiber displacements obtained by applying horizontal and vertical forces to the bar 41 are not themselves strictly horizontal and vertical, they can be treated as such in practice, given the length of the lever arm and the small size of the displacements involved.

Axial displacements are obtained by moving the block 40 which is mounted via ball bearings on rails 36. When the block 40 moves, the arm 41 and the moving fiber at its end also move. The block 40 is moved by a high resolution micro-motor represented in FIG. 3 by arrows 37 and 38.

When the end of the moving fiber 6 abuts against the end of the reference fiber 2, the pressure which it exerts thereon causes the ends of the touching fibers to deflect in the OX-OY plane. This deflection is detected by the optical system and is signalled to the microprocessor 17 which has stored the size of the advance step taken immediately prior to such deflection. The microprocessor responds to the deflection by instructing the moving fiber 6 to back off a little, (eg a few tenths of a micron), and then starts a welding cycle.

The welding cycle includes a first operation of heating to below the melting point of the optical fiber material, in order to round the edges of their ends and thus avoid including any air bubbles at the interface during welding proper. This preheating may be performed by means of a carbon dioxide laser.

The preheating is followed by a short pause, and then by welding proper in which the ends of the fibers are raised above their melting points. This cycle is likewise under the control of the microprocessor, but in a variant it could be under manual control.

Figure 4:
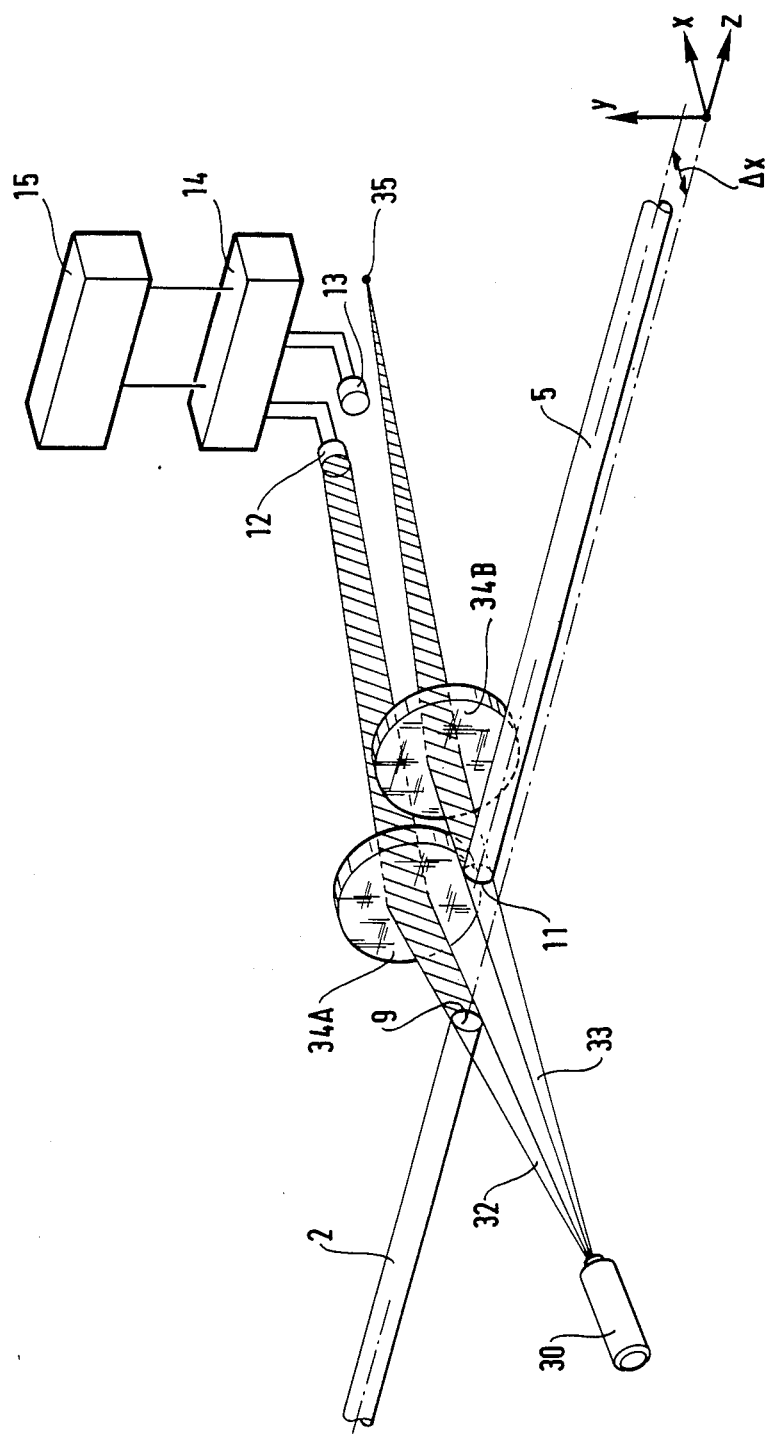
FIG. 4 is a perspective diagram of a second opto-electronic reader device having a single light source, two optical condenser systems and simple photodetectors.

In FIG. 4 a single light source 30 directs two pencil beams (shown diagrammatically at 32 and 33) to the ends of the fixed and the moving fibers 2 and 5. The axis of the moving fiber 5 is shown offset from the axis of the fixed fiber 2 in a horizontal plane by an amount x. The pencil beams are directed by respective optical lens systems 34A and 34B towards the optical pick-ups 12 and 13. Since the reference fiber 2 is correctly placed, the beam 32 falls on the surface of the optical pick-up 12, together with a dark portion caused by the shadow cast by the fiber. Since the fiber 5 is off axis, the light beam 33 forms a spot of light 35 off the pick-up 13 (clearly if the moving fiber 5 were nearer to its correct position, then the spot would fall at least in part on the pick-up 13). The signals from the pick-ups 12 and 13 are converted into respective electrical signals by the transducers 14, and are compared by a comparator 15 which generates an error signal for application to the microprocessor 17 after amplification. The microprocessor then causes the moving fiber 5 to be moved in a horizontal plane until it is in alignment with the fixed fiber 2, as described above.

Figure 5:
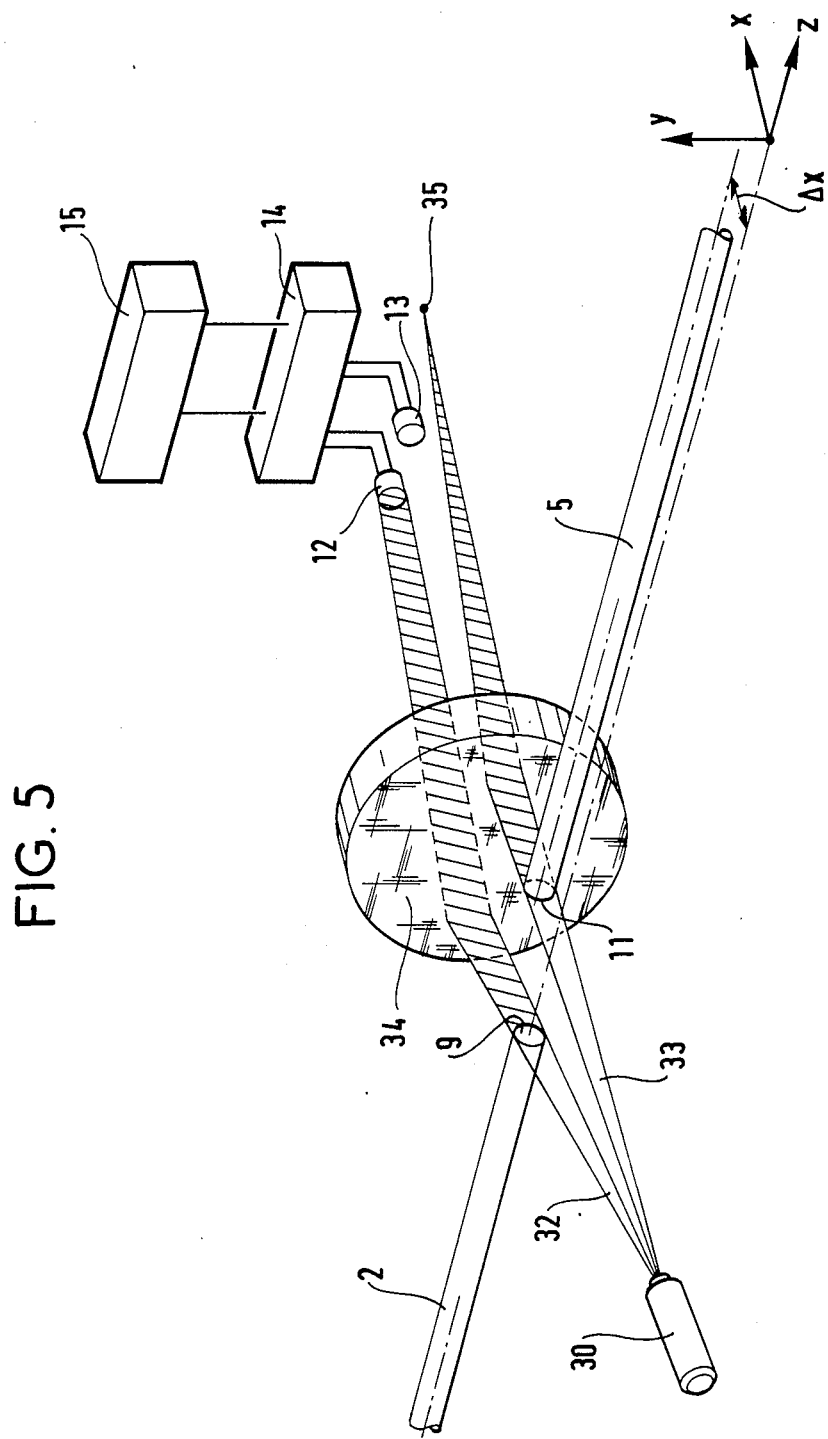
FIG. 5 is a perspective diagram of a third opto-electronic reader device having a single light source, a single optical condenser system and simple photodetectors.

FIG. 5 shows a similar optical sensor arrangement to FIGS. 2 and 4, using a single light source 30 as in FIG. 4 and a single optical lens system 34 as in FIG. 2.

Figure 6:
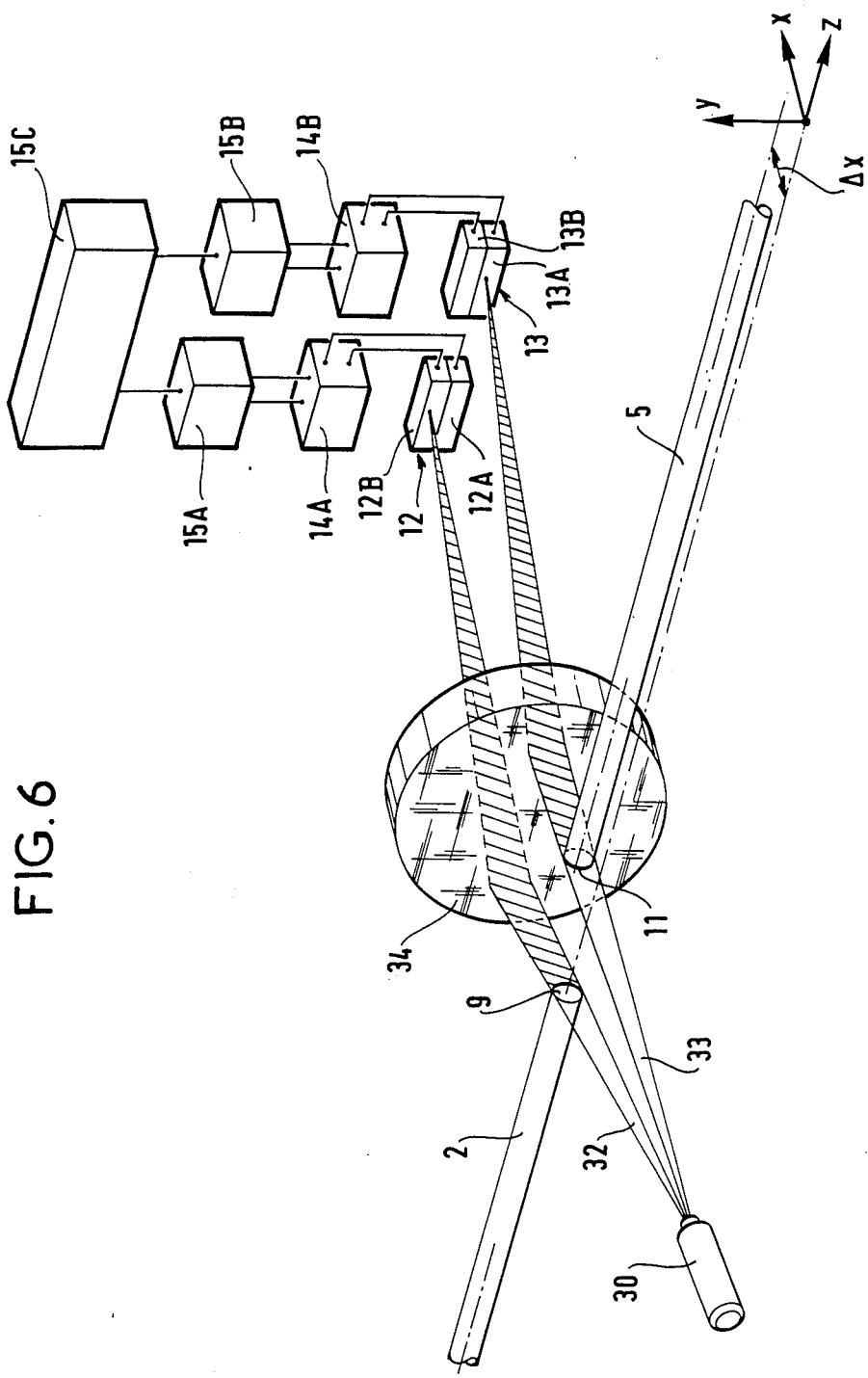
FIG. 6 is a perspective diagram of a fourth opto-electronic reader device having a single light source, a single optical condenser system, and photodetectors which comprise two associated halves, together with electronic comparators connected to a common comparator for adjusting the positions of the two optical fibers.

FIG. 6 shows an improvement over the FIG. 5 arrangement, and constitutes the preferred embodiment of the invention. As in FIG. 5 there is a single light source 30 and a single optical lens system 34. However, each optical pick-up 12, 13 is now constituted by a pair of pick-ups 12A, 12B or 13A, 13B. Each individual pick-up is connected to a corresponding transducer in a box marked 14A or 14B as the case may be. The electrical signals from each pair of pick-ups are then compared by respective comparators 15A and 15B, and the output signals from these comparators are themselves compared in a comparator 15C which provides an error signal for feeding to the microprocessor.

If a moving fiber 5 is off axis relative to the fixed fiber 2, its shadow does not fall equally on the two portions of the corresponding pick-up 13. The unequal electrical signals that result therefrom are a direct function of the position of the fiber 5. The same is true for the shadow of the reference fiber on the pair of pick-ups 12. The position of the moving fiber 5 can therefore be adjusted to ensure that it is exactly the same degree off its nominal position (as determined by the optical system from the source 30 via the lens system 34 and on to the pick-ups 12 and 13) as is the reference fiber 2.

One of the advantages of using pairs of pick-ups is that information is available to the microprocessor concerning the sign of the offset, so it begins its corrective action in the right direction. Another advantage is that the differential system constituted by each pair of pick-ups is relatively insensitive to possible variations in the ratio of the image area to the active area of the pick-up.

It will readily be understood that the various options described above (one or two light sources, one or two lens systems, single pick-ups or pairs of pick-ups) can be mixed in combinations other than the four specifically shown in the drawings. In particular, pairs of pick-ups can be used with two optical lens systems, and/or with two light sources.

We claim:

1. In an automatic machine for welding optical fibers end-to-end, said machine comprising:
   first and second optical support plates respectively for supporting a first "reference" optical fiber and a second, "moving" optical fiber in end facing general axial alignment;
   automatic translation means connected to said second support plate for moving said second support plate in two orthogonal directions which are perpendicular to the axes of the fibers;

automatic translation means connected to one of said support plates for moving said support plate parallel to the axes of the fibers;

manual translation means connected to the other of said support plates for moving said other support plate parallel to the axes of the fibers;

position detecting means comprising light source means for illuminating the ends of the optical fibers; optical lens means for forming magnified images thereof; and optical pick-up means for sensing the positions of said images and for generating signals responsive to sensed positions of said images;

control means responsive to said signals derived from said optical pick-up means and connected to said automatic translation means to effect control thereof; and fiber welding means for welding together the ends of said optical fibers;

the improvement wherein said light source means comprises means illuminating the ends of said optical fibers in a plane perpendicular to the axes of said optical fibers, and said pick-up means comprises means for detecting the position of each fiber end in two orthogonal directions corresponding to said orthogonal directions perpendicular to the axes of the fibers, said pick-up means comprising at least two optical pick-ups for each fiber end and at least one optical pick-up for each of said orthogonal directions, optical transducers connected to respective optical pick-ups for converting said optical signals into respective electrical signals, and means connecting electronic comparators to said transducers so that, for each of said orthogonal directions, the electrical signals derived from the pick-ups associated with different optical fiber ends are electronically compared, and means connecting said comparators to said control means for feeding electrical signals resulting from said comparisons representing misalignment of said optical fibers in respective orthogonal directions perpendicular to said axes of said optical fibers to said control means to enable said control means to control said automatic translation means to bring said fiber ends within one tenth of a micron degree of axial alignment, and into end-to-end contact ready to be welded together;

and wherein said light source means comprises a separate light source for each of said two orthogonal directions, each of said separate light sources is located on one side of the fiber ends, said lens means comprise separate lens means located on the other side of the fiber ends opposite said separate light sources, respectively, for forming magnified real images of the optical fiber ends and respective optical pick-ups are located at said magnified real images.

2. A machine according to claim 1, wherein said control means comprises a microprocessor.

3. A machine according to claim 1, wherein said comparators are connected to operate respective light-emitting diodes.

4. A machine according to claim 1, wherein said automatic translation means for movement in a direction parallel to the fiber axes is connected to said second support plate for supporting the moving fiber.

5. A machine according to claim 1, wherein said automatic translation means for movement in a direction parallel to the fiber axes comprises a high-resolution stepper motor.

6. A machine according to claim 1, further comprising means for backing off the moving fiber by a few tenths of a micron after end-to-end contact is established between the fibers.

7. A machine according to claim 6, wherein said means for backing off the moving fiber comprise means under the control of said control means.

8. A machine according to claim 1, wherein said second support plate for supporting the moving fiber is fixed to the free end of a cantilever bar having an intermediate point engaged in a bead of very hard material, said bead being in contact with wedges of piezoelectric material set at right angles to each other which comprises said automatic translation means for moving said second support plate in two orthogonal directions perpendicular to the fiber axes.

9. A machine according to claim 1, further wherein said means for welding the ends of the fibers comprises electric arc welding electrodes made of platinum plated tungsten.

10. A machine according to claim 1, including means for preheating the ends of the aligned fibers while not in end-to-end contact, to polish the fibers end faces prior to welding.

11. A machine according to claim 1, wherein each optical pick-up means for sensing an image of a fiber end comprises a pair of optical pick-ups connected to a corresponding pair of respective transducers, the electrical signals from each pair of transducers being connected to a corresponding electronic comparator to provide an electrical signal representative of the position of the corresponding fiber end image.

12. A machine according to claim 11, wherein, for each of said orthogonal directions, said electrical signals representative of the positions of the fiber end images are themselves compared by an electronic comparator.

* * * * *